United States Patent [19]

Ogasawara

[11] Patent Number: 4,613,224
[45] Date of Patent: Sep. 23, 1986

[54] MOTOR DRIVER FOR AUTO-FOCUS CAMERA

[75] Inventor: Akira Ogasawara, Yokohama, Japan

[73] Assignee: Nippon Kogaku K. K., Tokyo, Japan

[21] Appl. No.: 692,631

[22] Filed: Jan. 18, 1985

Related U.S. Application Data

[63] Continuation of Ser. No. 510,681, Jul. 5, 1983, abandoned.

[30] Foreign Application Priority Data

Jul. 10, 1982 [JP] Japan ................... 57-120153
Sep. 14, 1982 [JP] Japan ................... 57-158792

[51] Int. Cl.⁴ .............................................. G03B 3/00
[52] U.S. Cl. ................... 354/402; 354/195.12; 354/286
[58] Field of Search ................... 354/400–409, 354/195.12, 286

[56] References Cited

U.S. PATENT DOCUMENTS

| Re. 31,219 | 4/1983 | Shenk | 354/400 |
| 4,284,335 | 8/1981 | Takamae et al. | 354/404 |
| 4,319,171 | 3/1982 | Motoori | 354/400 |
| 4,336,987 | 6/1982 | Shenk | 354/409 |
| 4,348,089 | 9/1982 | Shenk | 354/400 |
| 4,360,258 | 11/1982 | Hashimoto | 354/400 |
| 4,422,739 | 12/1983 | Watanabe et al. | 354/404 |
| 4,473,286 | 9/1984 | Watanabe et al. | 354/406 |
| 4,496,229 | 1/1985 | Ogasawara | 354/286 |

Primary Examiner—Russell E. Adams
Attorney, Agent, or Firm—Shapiro and Shapiro

[57] ABSTRACT

A motor driver circuit for auto-focus camera comprising a voltage supply circuit, a duty ratio changing circuit for changing the duty ratio of pulse signal according to the voltage level of said voltage supply circuit and a control circuit for controlling the supply of driving current to the motor by virtue of the output signal from said duty ratio changing circuit.

17 Claims, 20 Drawing Figures

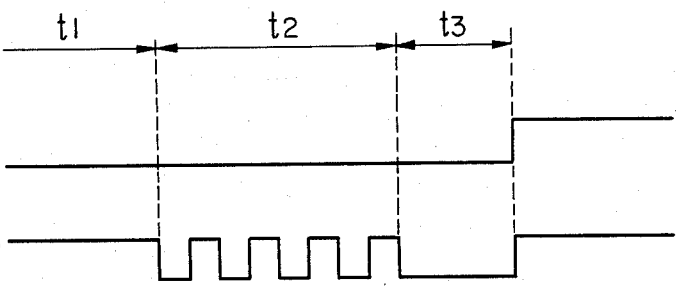
FIG. 3A
FIG. 3B
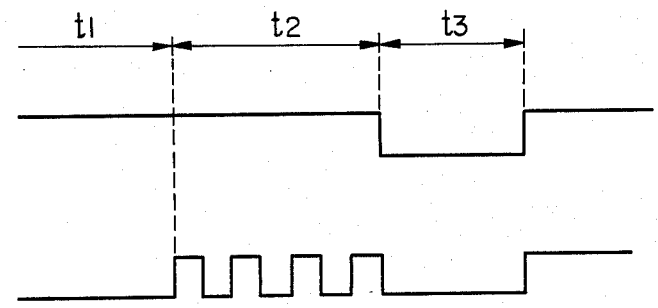
FIG. 4A
FIG. 4B

FIG. 6
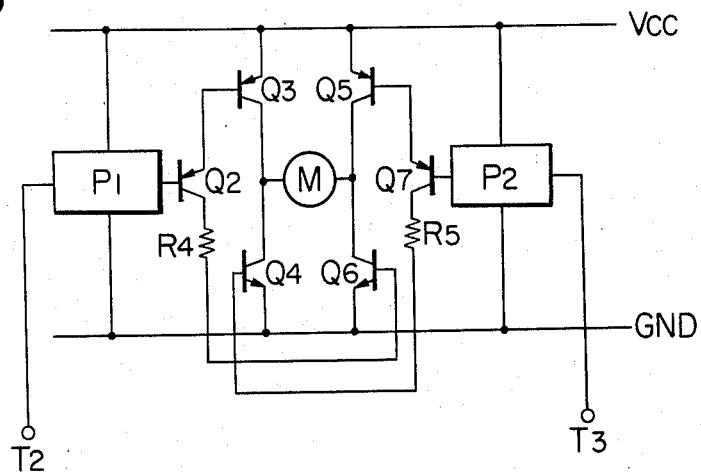
FIG. 7
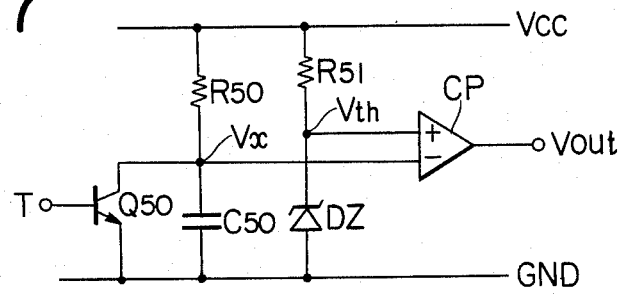
FIG. 8A
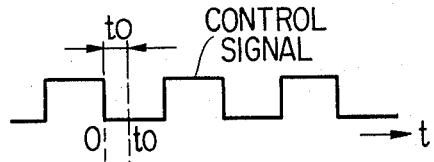
FIG. 8B
FIG. 8C
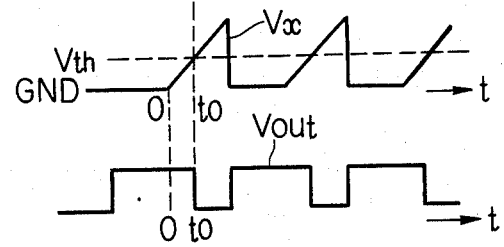

FIG. 9
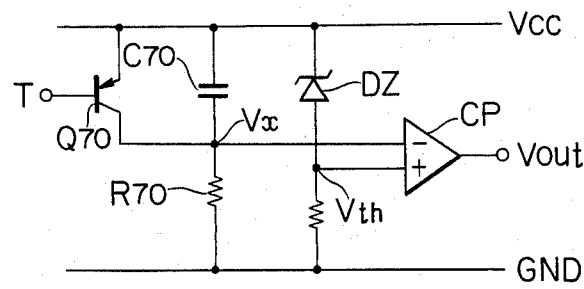
FIG. 10A
FIG. 10B
FIG. 10C
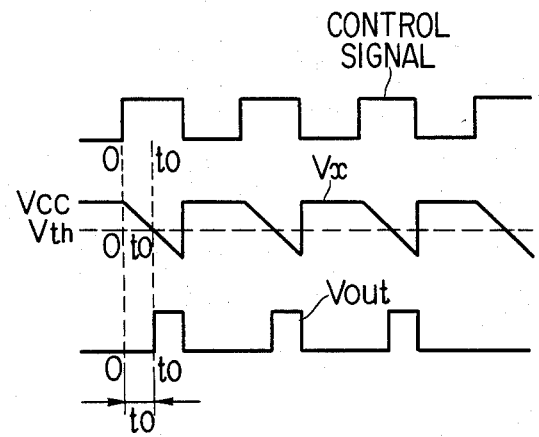
FIG. 12A
FIG. 12B
FIG. 12C
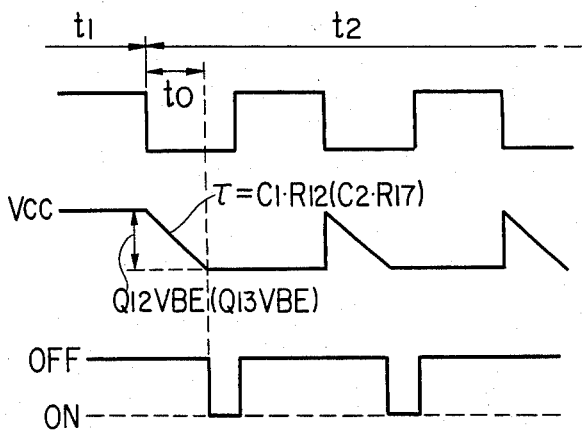

MOTOR DRIVER FOR AUTO-FOCUS CAMERA

This is a continuation of application Ser. No. 510,681, filed July 5, 1983, now abandoned.

BACKGROUND OF THE INVENTION

1. Field of the Invention

The present invention relates to an automatic focussing device for a camera having plural taking lens units and a camera body. More particularly, the present invention relates to a motor driver for driving the taking lens in such an auto-focus camera.

2. Description of the Prior Art

Various types of automatic focussing devices are known in the prior art. Generally the auto-focus device for a photographing camera is required to have a high response speed and a high accuracy in focussing. The first requirement is to move the taking lens of the camera to its in-focus position in a short time and as fast as possible. The second requirement is to stop the taking lens accurately in the in-focus position without overshooting. In practice, these two problems are contradictory to each other. Therefore, the driving system used in the auto-focus device is especially important.

As a solution to the problems there has already been proposed such a driving system in which the taking lens is driven in two different driving modes. When the object is far out of the focus, the taking lens is moved toward the focus position at a higher speed. However, when the object is relatively near the focus, the lens is driven to the in-focus position at a lower speed. In this manner, the time required for focussing is shortened on one hand and the lens can be stopped correctly in the in-focus position by a good-time actuation of the brake on the other hand. The drop-down of the driving speed for the object near the focus can be attained in various manners. For example, it may be attained by lowering the level of the driving voltage applied to the motor for driving the taking lens or intermittently driving the motor by means of pulses.

As another solution there has been proposed such a driving system in which the motor for driving the taking lens is driven depending upon the amount of deviation of the lens image plane from the focus position. Thus, the taking lens is moved by the motor up to the position in which the deviation is zero.

However, the prior art driving methods as mentioned above have a common drawback that satisfactorily precise focussing can not always be attained in particular when the driving system is used for different kinds of taking lens units. The lens units for which the above-mentioned driving system is intended be used may be different from each other, for example, in gear ratio of lens driving power transmission gears, friction produced in the course of power transmission, weight of mechanical system and inertial moment thereof. Because of these various differences, different lens units often have different characteristics of running speed and brake effect. In this case, therefore, it is required to drive the different lens units in different manners which are the optimum ones for them respectively. This can not be attained by the above-mentioned prior art driving systems in which the same driving voltage or driving pulses are always control the lens driver circuit for different lens units. According to the prior art, there is produced such a case where the lens unit then used in a camera can not be correctly brought into its in-focus position. For example, in case that a lens unit of higher running speed is used, the brake may fail to stop the taking lens just at its in-focus position. The taking lens passes over the aimed in-focus position and repeats hunting. On the contrary, for a lens unit of lower running speed, a longer time is required to bring the taking lens to its in-focus position although there is no problem of overshooting or hunting. Such a low response time is naturally undesirable for auto-focussing.

To control a servo system including a motor driver there is also known in the prior art such a control method according to which the power supply to the motor is carried out in a pulse fashion and the power supply time is gradually or stepwisely shortened with the system's approaching to the servo target. This control method has been proposed for the purpose of improving the responsiveness of the servo system. However, this prior art method also involves a drawback that the responsiveness of the servo system is not constant but variable. For example, if a battery or a power source the voltage of which changes with time is used to drive the motor, then the responsiveness will easily be changed by the change of the driving voltage.

SUMMARY OF THE INVENTION

Accordingly it is an object of the present invention to provide an auto-focus device which can drive the lens motor with motor driving current variable according to the driving characteristics of the taking lens then used thereby always assuring the optimum response speed and braking characteristics for the taking lens in any kind of lens unit.

It is another object of the invention to provide a motor driver in which the duty ratio of the motor driving pulse can automatically be changed depending upon the level of the driving voltage thereby eliminating or minimizing the problem of variation in responseness with the change of driving voltage.

Other and further objects, features and advantages of the invention will appear more fully from the following description taken in connection with the accompanying drawings.

BRIEF DESCRIPTION OF THE DRAWINGS

FIGS. 3A, 3B and 4A, 4B are timing charts of the control signals applied to the terminals of the control unit;

FIG. 6 is a circuit diagram showing the basic arrangement of the apparatus according to the invention;

FIG. 7 shows a concrete circuit form of the duty ratio changing circuit shown in FIG. 6;

FIGS. 8A–8C are timing chargs of the control signals in the circuit shown in FIG. 7;

FIG. 9 shows another circuit form of the duty ratio changing circuit shown in FIG. 6;

FIGS. 10A–10C are timing charts of the control signals in the circuit shown in FIG. 9;

FIGS. 12A–12C are timing charts illustrating the manner of operation of the pulse extension circuit part shown in FIG. 11.

DETAILED DESCRIPTION OF PREFERRED EMBODIMENTS

Figure 1:
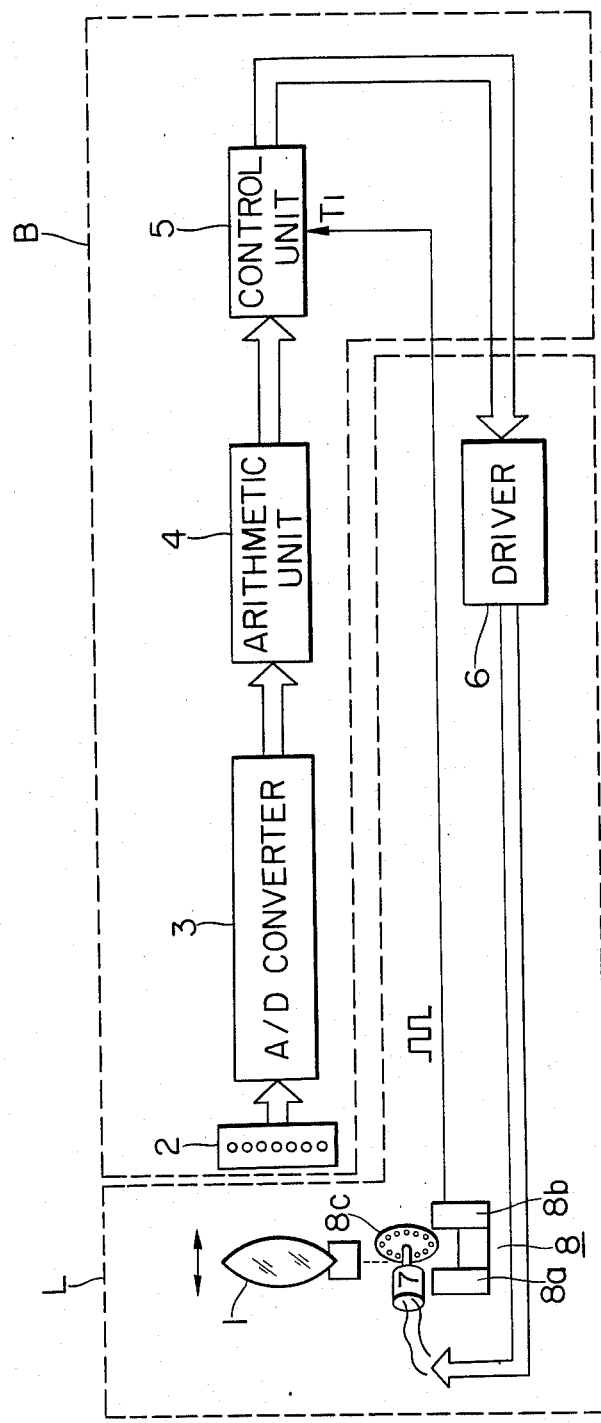
FIG. 1 is a block diagram schematically showing an embodiment of the invention.

Referring first to FIG. 1 showing the overall arrangement of a servo system, L generally represents a lens unit and B does a camera body. The servo system is an embodiment of the automatic focussing apparatus of the present invention.

1 is a taking lens disposed within the lens unit L and 2 is a sensor in the camera body B. The sensor 2 may be, for example, a charge coupled device (CCD). An object light passes through the taking lens and forms an image on the sensor 2 through an optical system of the automatic focussing apparatus, not shown. The sensor 2 separates the optical image into picture elements and produces picture element outputs corresponding to the detected picture elements. These outputs are introduced into an A/D converter 3. After A/D conversion by the converter 3, every picture element output is read in an arithmetic unit 4 by which the existing distance of the taking lens 1 from the in-focus position is calculated in a manner known per se. The result of the arithmetic operation is produced to a control unit 5. Based on the output from the arithmetic unit the controller 5 determines a control output which is applied to a driver 6 in the lens unit L to move the taking lens 1 toward the in-focus position. The taking lens is driven by a lens driving motor 7 for focussing. During the movement of the taking lens 1 by the lens motor 7, the amount of the movement of the lens is continuously detected by a sensor 8. The detected movement of the lens is fed back to the controller 5. The sensor 8 is composed of a light emitter 8a, a light receptor 8b and a rotary plate 8c interposed therebetween. The rotary plate 8c is driven into rotation by the lens motor 7. The rotary plate 8c is formed as a disk having a number of light transmissive portions and light untransmissive portions alternately arranged along the outer circumference of the disk. Therefore, with the rotation of the lens motor 7 the sensor 8 generates pulse signals the number of which corresponds to the amount of rotation of the motor 7. The pulse signals are transmitted to the controller 5 from the sensor 8. Hereinafter this pulse signal is referred to as feedback pulse signal.

Since, as noted above, the number of feedback pulses corresponds to the amount of rotation of the lens motor and therefore to the amount of movement of the taking lens, the number of feedback pulses generated correspond, in conclusion, to the moved distance of the object image by the taking lens 1.

When the output from the above-mentioned arithmetic unit and the number of the feedback pulses from the sensor 8 reaches a predetermined relationship, it is detected by the controller 5. At this time point, the controller 5 issues a control output to the driver 6 to apply a braking force to the lens motor 7. A certain determined braking time after the issuance of the control signal, the brake is released and one servo operation comes to end. The braking time is a time required to surely stop the motor by the brake. After completing one servo operation, the next servo operation is carried out repeating the above operation starting from the distance measuring step.

In the above-shown embodiment, the units 2, 3, 4 and 5 are arranged within a camera body B whereas members 6, 7, 8a, 8b, 8c and taking lens 1 are arranged within an exchangeable lens unit L.

Figure 2:
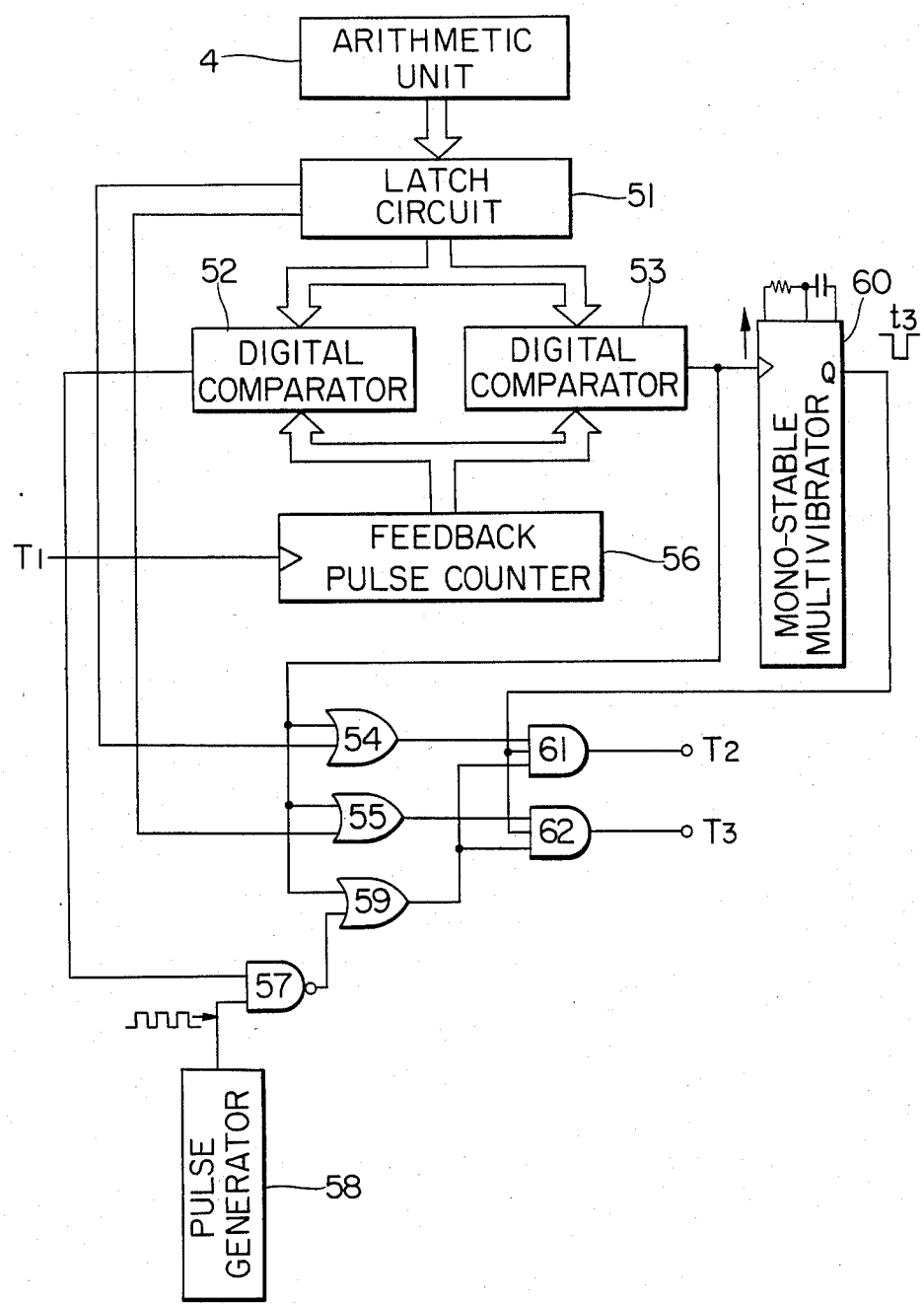
FIG. 2 is a block diagram showing a concrete arrangement of the control unit shown in FIG. 1.

A concrete form of the controller 5 is shown in FIG. 2.

In FIG. 2, reference numeral 51 denotes a latch circuit which receives from the above arithmetic unit 4 output signals informing of the position of the taking lens now being out of focus (front focus or rear focus) and the amount of deviation of the image plane (the distance between the present position of the object image and the predetermined focal plane). The latch circuit 51 sends out the image plane deviation signal to digital comparators 52 and 53, and the front or rear focus signal (by which the lens motor is rotated forward or backward) to OR gates 54 and 55. More concretely, as a front focus signal, the latch circuit 51 sends out a low level signal to gate 54 and a high level signal to gete 55. For a rear focus signal a high level signal is given to gate 54 and a low level signal to gate 55.

56 is a feedback pulse counter which starts to count the feedback pulses coming from the input terminal $T_1$ with the start of control operation. As previously described, the number of the feedback pulses corresponds to the moved distance of the object image resulted from the movement of the taking lens driven by the lens motor. The moved distance of the object image will hereinafter referred to as the amount of image plane movement.

The digital comparator 52 makes a comparison of the image plane deviation signal from the latch circuit 51 with the content of the counter 56. When the amount of image plane movement represented by the counter content approaches to the amount of image plane deviation represented by the deviation signal by a predetermined value, that is, when the difference between the amount of image plane deviation and the amount of image plane movement is reduced to a predetermined value, the digital comparator 52 generates a high level output as a signal informing that the taking lens 1 has just been moved to a predetermined position near the in-focus position. The high level signal is applied to a NAND gate 57. When the high level signal is applied to NAND gate 57 from the digital comparator 52, the pulse output of a pulse generator 58 is inverted through the NAND gate 57 and then applied to OR gate 59.

On the other hand, when the content of the counter 56, that is, the amount of image plane movement cones into coincidence with the image plane deviation signal, it is detected by the digital comparator 53 which then produces a high level signal informing that the taking lens has just reached its in-focus position. This output signal of high level is applied to OR gates 54, 55 and 59. At the same time, it triggers a monostable multivibrator 60. Then, the mono-stable multivibrator 60 generates a signal whose level is low only during the period of braking time $t_3$. The output signal is applied to AND gates 61 and 62 which are receiving at this time the outputs from OR gates 54, 59 and OR gates 55, 59 respectively.

With the above arrangement of the controller, so long as the taking lens is far out of the in-focus position, the output of the digital comparator 53 is at low level and therefore the outputs of OR gates 54, 55 are high level (front focus) or low level (rear focus). The output of the digital comparator 52 is at low level and therefore both of NAND gate 57 and OR gate 59 have high level outputs. The output of the mono-stable multivibrator 60 also has a high level output. Consequently the outputs of OR gates 54 and 55 are allowed to issue from terminals $T_2$ and $T_3$ as they are.

When the taking lens is near the in-focus position, as previously described, a pulse signal is applied to OR gate 59 from NAND gate 57. Since at this time, the output of the digital comparator 53 is at low level, or gate 59 transmits the pulse to AND gates 61 and 62 as it is. The output of the mono-stable multivibrator 60 is high level and either one of OR gates 54 and 55 has a high level output according to the existing state of out-of-focus, front focus or rear focus. The high level output is being applied to either of AND gates 61 and 62. Therefore, the pulse is generated from the AND gate 61 or 62 which is now receiving the high level output from OR gate 54 or 55. Consequently, the lens motor is driven by pulses during the period of operation.

Finally, the taking lens reaches its in-focus position. At this point, the output of the digital comparator 53 is turned to high level and therefore all the outputs of OR gates 54, 55 and 59 become high level. A brake pulse (Low level) is applied to AND gates 61 and 62 from the mono-stable multivibrator 60 for a certain determined braking time. Therefore, during the braking time period, a low level signal is being applied to the terminals $T_2$ and $T_3$ to apply the brake to the lens motor. After the lapse of the braking time, the mono-stable multivibrator 60 generates again a high level output by which the signal level of the terminals $T_2$ and $T_3$ is turned high. In this manner, one servo operation is completed.

The above manner of operation is shown in FIG. 3 which is a timing chart of the outputs of terminals $T_2$ and $T_3$ obtained in the case where the taking lens is brought into focus from a lens position which is out of focus (front focus).

Figure 5:
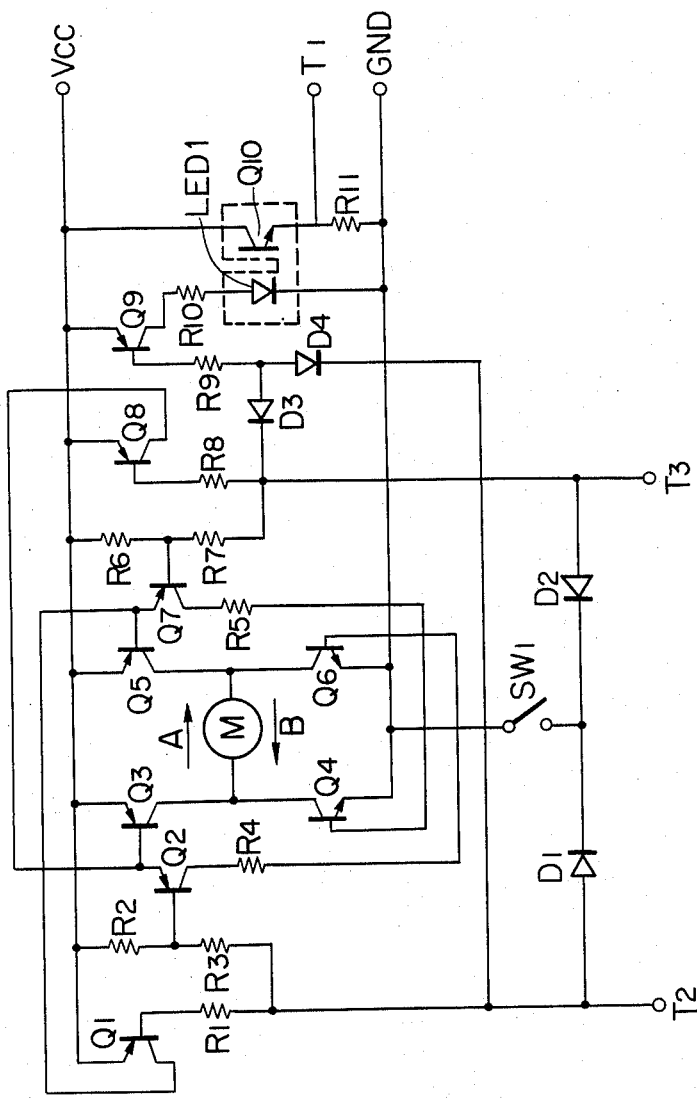
FIG. 5 shows an embodiment of the circuit of the driver unit shown in FIG. 1.

FIG. 5 shows a concrete circuit form of the driver 6. In the embodiment of the driver circuit shown in FIG. 5, the control signals coming from the controller shown in FIG. 2 are directly used without any correction. This type of driver circuit is provided in a lens unit 6 having a taking lens whose focal length is relatively short as in the case of a standard lens.

The manner of operation of the driver circuit is as follows:

$T_2$ and $T_3$ are input terminals to which control signals are applied from the control circuit 5 shown in FIG. 2. For the purpose of explanation it is assumed that the control signals are applied as digital signals, low level corresponds to 0V (GND) and high level corresponds to a voltage higher than $Vcc + V_{BE}$ wherein Vcc is a source voltage and $V_{BE}$ is the ordinary base-emitter potential, approximately 0.6V, of a transistor.

Hereinafter the operation modes of the driver circuit will be explained in detail in connection with the control signals applied to the input terminals $T_2$ and $T_3$.

(i) High level control signals are applied to both of terminals $T_2$ and $T_3$ (Waiting):

In this mode, a high level voltage is applied to the bases of PNP transistors $Q_1$, $Q_2$ and $Q_7$, $Q_8$ through resistors $R_2$, $R_3$ and $R_6$, $R_7$, $R_8$, respectively. Therefore, all of the transistors are non-conductive. Accordingly, PNP transistors $Q_3$ and $Q_5$ which form a bridge are also non-conductive. PNP transistors $Q_4$ and $Q_5$ whose bases are connected to the collectors of transistors $Q_7$ and $Q_2$ through resistors $R_5$ and $R_4$, are also non-conductive. Consequently, no power is supplied to the motor M. It is still. Since all of the transistors in the circuit are non-conductive, no electric current is consumed by it. This is the state of servo waiting.

(ii) A low level control signal is applied to $T_2$ whereas a high level control signal is applied to $T_3$ (Driving with forward rotation):

In this mode, a current is supplied to the base of transistor $Q_2$ to render it conductive. Thereby transistors $Q_3$ and $Q_6$ are rendered conductive. Consequently the current flows into the motor M in the direction of arrow A to drive it forwardly. On the other hand, $Q_7$ and $Q_8$ are non-conductive and therefore $Q_4$ and $Q_5$ also remain non-conductive. Although $Q_1$ becomes conductive at this time, it has no effect on the operation of the circuit because of $Q_5$ and $Q_7$ being non-conductive at this time.

(iii) A high level control signal is applied to $T_2$ whereas a low level control signal is applied to $T_3$ (Driving with backward rotation):

The operation of the circuit in this mode is just opposite to that in the above mode (ii). Transistors $Q_4$, $Q_5$, $Q_7$ and $Q_8$ are rendered conductive and the remaining transistors are all non-conductive. Therefore, the current flows into the motor M in the direction of arrow B which is opposite to the direction A in (ii). Thus, the motor is driven into backward rotation (reverse rotation to that in the above (ii)).

(iv) Low level signals are applied to both of $T_2$ and $T_3$ (Braking operation):

Transistors $Q_2$ and $Q_7$ are rendered conductive. At the same time, $Q_1$ and $Q_8$ also become conductive. Therefore, current is supplied to the emitter of $Q_7$ from $Q_1$ and to the emitter of $Q_2$ from $Q_8$. The saturation voltage $V_{CE}$ at the collector - emitter of $Q_1$ and $Q_8$ is lower than the voltage $V_{BE}$ required to render $Q_5$ and $Q_3$ conductive. Consequently only the transistors $Q_4$ and $Q_6$ are rendered conductive thereby while $Q_3$ and $Q_5$ are non-conductive. The loop constituted of transistors $Q_4$, $Q_6$ and the motor M now being in operation serves as a brake to stop the motor at the time. The reason for this is that after cutting off the motor driving current, the motor M continues to rotate due to inertia and it momentarily becomes a generator which supplies an amount of current to the short-circuited loop. At the time, the energy of rotation is dispersed as thermal energy, which has an effect to apply brake on the motor M (rheostatic braking). During this stage of rheostatic braking, either of transistors $Q_4$ and $Q_6$ operates in inverted transistor mode (which means such a state of transistor in which the roles of emitter and collector are inverted with respect to each other and, if the transistor is a NPN transistor, the current flows from emitter to collector).

In FIG. 5, $LED_1$ is a light-emitting diode which forms the light emitter 8a shown in FIG. 1 and $Q_{10}$ is a photo transistor which forms the light receptor 8b.

The photo diode $LED_1$ is connected to the collector of a transistor $Q_9$ whose base is connected to the terminal $T_3$ through resistor $R_9$ and diode $D_3$, and to the terminal $T_2$ through resistor $R_9$ and Diode $D_4$. When at least one of the terminals $T_2$ and $T_3$ is at low level in the above modes (ii), (iii) and (iv), the transistor $Q_9$ is rendered conductive to supply the current to $LED_1$ through resistor $R_{10}$. Thus, the light-emitting diode $LED_1$ emits light. Therefore, during the motor driving period the amount of movement of the taking lens 1 is detected by the photo interruptor composed of the light-emitting diode $LED_1$ and photo transistor $Q_{10}$. The feedback pulse signal appears at terminal $T_1$ connected to ground through resistor $R_{11}$. From the output terminal $T_1$ the feedback pulse signal is sent out to the controller 5.

The modes described above are all static modes. In addition to the static modes, the lens driver circuit has a dynamic driving mode. When the taking lens comes in the range near the in-focus position, the lens driving speed should be dropped to achieve better braking effect on the lens motor thereby correctly stopping the lens at its in-focus position. The dynamic driving mode is a mode for this purpose. Hereinafter the dynamic driving mode will be described with reference to the timing chart shown in FIGS. 3A and 3B.

During the period of $t_1$ in FIGS. 3A and 3B, the driver circuit operates in static mode (ii) or (iii) in which one of the terminals $T_2$ and $T_3$ is at high level (FIG. 3B) and the other at low level (FIG. 3A). Therefore, the motor is rotating at its full speed.

When the lens has been moved up to a position near the in-focus position, it is detected by the controller 5 from the number of the feedback pulses counted. At this point, the driving mode is switched over to pulse driving mode. This mode is shown in the second period $t_2$ in FIGS. 3A and 3B. During the period $t_2$, one of the terminals $T_2$ and $T_3$ remains at low level. But, the other terminal repeats the change of level from High to Low and from Low to High periodically. Consequently, the motor is braked when the level of the other terminal is low and it is driven when the level is high. In other words, the above-mentioned static modes (i) and (iv) are alternately repeated. Thereby the power supply time to the motor is reduced during the period $t_2$ as compared with the power supply time in (ii) and (iii). In this manner, the lens driving speed is decreased as compared with the speed during the first period $t_1$.

When the taking lens has just reached the in-focus position, both of the terminals $T_2$ and $T_3$ receive a low level signal to apply a brake to the motor. The brake signal continues for a certain determined time $t_3$ which is the braking period. During the braking period, the motor is stopped instantly by the brake action.

Throughout all of the periods $t_1$, $t_2$ and $t_3$, one of the control inputs $T_2$ and $T_3$ continues to be at low level as described above. Therefore, when the taking lens is being driven, the light-emitting diode $LED_1$ continues emitting light to assure the generation of feedback pulse during the time of the motor being driven. (During the brake period $t_3$, the motor is stopping and therefore the light emitted from $LED_1$ during this period is not significant).

In the above, the speed reduction of the motor in dynamic driving mode $t_2$ has been attained by repeating braking and driving in a pulse fashion. However, the speed reduction may be attained according to another method as shown in FIGS. 4A and 4B. According to the method, driving and stopping are repeated in a pulse fashion without braking.

Referring to FIGS. 4A and 4B, the level of the control signal to one input terminal remains high during the periods of $t_1$ and $t_2$. At the other input terminal, the input control signal is low during the period of $t_1$ and it becomes a pulse during the period of $t_2$. In this case, therefore, the above modes (i) and (ii) or (iii) are repeated in a pulse fashion during the period of $t_2$. If this method is carried out using the same circuit as shown in FIG. 5, the light-emitting diode LEDwill repeat ON and OFF alternately during $t_2$. This disturbs the generation of feedback pulses. Therefore, in this case, the driver circuit shown in FIG. 5 must be so modified as to keep the light-emitting diode $LED_1$ in the state of ON even during $t_2$. This may be realized by omitting one of the diodes $D_3$ and $D_4$ and providing a circuit which continuously supplies as input a low level signal into the other cathode during the time of the motor being driven. In other respects, the timing chart of control signals shown in FIGS. 4A and 4B are the same as that in FIGS. 3A and 3B. The duty of the pulse during $t_2$ may be, for example, 50%.

In the above-described driver circuit, the duty ratio of the driving pulse is not changeable but constant irrespective of the variation of the motor driving power source voltage Vcc as seen from FIGS. 3A, 3B and 4A, 4B. Since the duty ratio of the pulse is constant, the motor speed, that is, the servo responsiveness undesirably changes according to the existing level of the voltage Vcc which is variable. To eliminate this disadvantage, according to the present invention, there is provided means for changing the duty ratio according to the change of the source voltage Vcc. By this means the motor speed (torque) in the area near the servo target is kept constant or at least the variation of the speed (torque) is minimized whereby the servo responsiveness can be stabilized to the variation of the source voltage.

FIG. 6 shows the principle of the present invention. In FIG. 6, like reference characters to FIG. 5 represent the same or corresponding circuit elements. Designated by $P_1$ or $P_2$ is a duty ratio changing device. The control signal pulse applied to the terminal $T_2$ or $T_3$ is suitably changed in duty ratio by the duty ratio changing device $P_1$ or $P_2$ according to the existing value of the source voltage Vcc. After changing the duty ratio, the duty ratio changing device sends out the control signal to the output stage of the motor driving circuit as a driving pulse.

A concrete circuit form of the duty ratio changing device $P_1$ or $P_2$ is shown in FIG. 7.

Referring to FIG. 7, a resistor $R_{51}$ and Zener diode DZ forms a reference voltage Vth which is applied to the non-inversion input of a comparator CP. The value of the reference voltage Vth is determined by the characteristics of the Zener diode DZ and is not affected by the variation of the source voltage Vcc. Applied to the inversion input of the comparator CP is a voltage Vx appearing at the connection point of resistor 50 and condenser $C_{50}$. When transistor $Q_{50}$ is non-conductive, the condenser $C_{50}$ is charged with charge current flowing through the resistor at that time. The voltage Vx is the charge voltage on the condenser $C_{50}$. The voltage Vx is affected by the change of the source voltage Vcc.

When the signal level at the input terminal T becomes high, the transistor $Q_{50}$ is rendered conductive. Ignore Vcc saturation voltage of the transistor $Q_{50}$. Then, the voltage Vx is 0V at this time. Therefore, the output Vout of the comparator CP namely Vout becomes high level. Thereafter, when the terminal T has a low level signal, the transistor $Q_{50}$ is rendered non-conductive. Now charge current flows to the condenser $C_{50}$ 0 through resistor $R_{50}$ and charging of $C_{50}$ starts from the source voltage Vcc. With charging of $C_{50}$ the voltage Vx increases. Taking the time point at which the terminal T receives the low level signal to be the starting time point, $t=0$, the voltage Vx is given by:

$$Vx = Vcc\left\{1 - \exp\left(-\frac{t}{\tau}\right)\right\} \tag{1}$$

wherein $\tau = CR$; C is the capacity of the condenser $C_{50}$ and R is the resistance value of the resistor $R_{50}$.

When the voltage Vx reaches the reference voltage Vth, the comparator's output Vout is inverted and the level thereof becomes low. The time $t_0$ required for the output Vout to become low level from the starting time point $t=0$ is given by:

$$t_0 = \tau \cdot \ln \frac{Vcc}{Vcc - Vth} \qquad (2)$$

FIGS. 8A to 8C are a timing chart showing the waveforms of signals produced in the circuit shown in FIG. 7.

FIG. 8a shows the pulse-shaped control signal applied to the input terminal T, FIG. 8B shows the voltage Vx obtained when the pulse control signal is applied to the terminal T and FIG. 8C shows the comparator s output Vout.

In FIG. 8A, the control signal changes from a high level signal to a low level one at $t=0$. As seen in FIG. 8B, the voltage Vx starts to rise at $t=0$ and it reaches the reference voltage Vth at $t=t_0$. Therefore, in FIG. 8C, the output voltage Vout of the comparator CP changes from a high level to a low level. Compare the control signal pulse in FIG. 8A with the output voltage pulse Vout in FIG. 8C. Then it will be understood that the high level period of Vout is elongated as compared with that of the control signal pulse.

From the above equation (2) it is seen that the time $t_0$ becomes longer with decreasing of the source voltage Vcc. Therefore, the duty ratio of the output voltage pulse is increased when the source voltage Vcc decreases.

The duty ratio changing circuit shown in FIG. 6 can be incorporated into the driving circuit shown in FIG. 5 to which control signals are applied in a manner as shown in FIG. 3. In the driving circuit without such a duty ratio changing circuit, if the voltage of the power source drops, the motor driving current will decrease and therefore the rotational speed of the motor will decrease undesirably. In the driving circuit provided with the above duty ratio changing device, there can be obtained a larger duty ratio when the source voltage Vcc drops. By increasing the duty ratio the braking time is reduced. It has an effect to compensate the speeddown of the motor caused by the voltage drop of the power source.

FIG. 9 shows another circuit form of the duty ratio changing device. The arrangement of this circuit is inverted to that of the above circuit shown in FIG. 7. In operation, the two circuits shown in FIGS. 7 and 9 are entirely the same. Consequently the embodiment of FIG. 9 will not be described in detail. The duty ratio changing circuit shown in FIG. 9 functions to extend the low level duration of the input pulse. This curcuit may be advantageously used for control signals as shown in FIG. 4. Since the driving time is extended by the circuit when the source voltage Vcc decrease, it has also an effect to compensate the reduction of the motor revolution speed caused by the voltage-down of the power source.

FIGS. 10A, 10B, 10C show the waveforms of the signals in the circuit shown FIG. 9.

The lens drivers described above can change the duty ratio of driving pulses at $t_2$ of FIGS. 3A, 3B and 4A, 4B according to the driving characteristics of the lens then used so that the running speed of the lens, more precisely the moving speed of the image plane in the area near the focal point can be adjusted to the optimum value for automatic focussing. The embodiment shown in FIG. 7 is particularly suitable for use in a lens unit including a large lens such as a lens having a long focal length. Such a large lens has generally a large mechanical load. Therefore, if it is driven by driving pulses with 50% of duty ratio during $t_2$, the reduction of the lens speed at $t_2$ becomes too great as compared with the speed during the continuous driving period of $t_1$. The embodiment of FIG. 7 functions in such manner as to increase the driving time while reducing the braking time during the period of $t_2$. For this function the embodiment is particular suitable for driving a large lens such as a long focal length lens in an auto-focus camera.

On the contrary, the embodiment shown in FIG. 9 is suitable for a lens unit containing a relatively small lens such as a short focal length lens.

Figure 11:
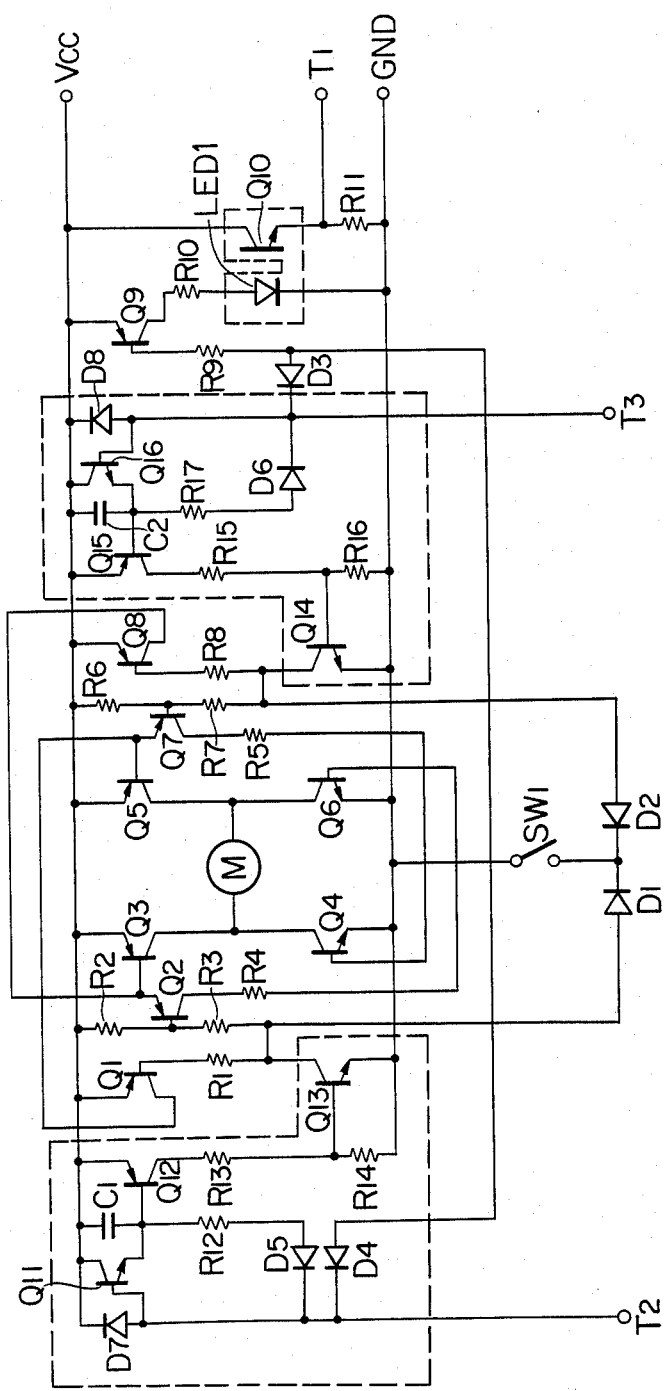
FIG. 11 shows another embodiment of the driver circuit.

FIG. 11 shows another embodiment of driver circuit which is also provided with the function to change the duty ratio of input control pulse and which is arranged within a lens unit containing a large lens.

The embodiment of FIG. 11 is formed by adding a duty ratio changing circuit to the circuit previously shown in FIG. 5. In FIG. 11, the part enclosed by broken line is the added circuit part for changing the duty ratio of pulse a timing chart of which is shown in FIGS. 12A–12C. Therefore, hereinafter the manner of operation of the embodiment will be described with respect to only the duty ratio changing circuit part with reference to the timing chart shown in FIGS. 12A–12C.

In the circuit of FIG. 11, a transistor $Q_{11}$ becomes conductive simultaneously with the rise of signal level from low to high at the terminal $T_2$. Thereby the condenser $C_1$ is discharged instantly. With the discharging of $C_1$, transistors $Q_{12}$ and $Q_{13}$ are rendered non-conductive as shown in FIG. 12C. The emitter of $Q_{13}$ is connected to the collector of $Q_{12}$ through resistors $R_{13}$ and $R_{14}$. The base of $Q_{13}$ is connected to the collector of $Q_{12}$ through resistor 13. $D_7$ is a diode the function of which is to prevent the high level input at the terminal $T_2$ from rising over the level of $Vcc + V_D$ (conduction voltage of diode). Any unnecessarily high voltage is clamped by it. Therefore, during the time of high level signal being applied to $T_2$, the condenser $C_1$ is inversely charged so that the base voltage of $Q_{12}$ can not exceed Vcc as shown in FIG. 12B, provided that there is a suitable large signal source impedance during the high level period of input at $T_2$.

At the time of fall-down of the input signal to low level at $T_2$, the transistor $Q_{11}$ is rendered non-conductive. Charging of the condenser $C_1$ is started through diode $D_5$ and resistor $R_{12}$. Let $V_B$ denote the base voltage of the transistor $Q_{12}$ and $t=0$ be the time point of the fall-down to low level of the signal at $T_2$. Then, the voltage $V_B$ is given by:

$$V_B = Vcc \cdot \exp\left(-\frac{t}{\tau}\right) \qquad (3)$$

wherein, $\tau = c_1 \cdot r_{12}$:

$c_1$ is the capacity of the condenser $C_1$ $r_{12}$ is the resistance value of the resistor $R_{12}$, and the conduction voltage of the diode $D_5$ is ignored and the signal source impedance during the time of low level of $T_2$ is considered to be 0 (zero).

The base voltage $V_B$ drops with a time constant $\tau$ of as shown in FIG. 12B. The time point at the transistor $Q_{12}$ becomes conductive is within the descending curve of $V_B$. Let $V_{BE}$ denote the base-emitter voltage required to render $Q_{12}$ conductive and $t_0$ the time period up to the conduction of $Q_{12}$ after the period $t_1$. Then, the time $t_0$ is given by:

$$t_0 = \tau \ln \frac{Vcc}{Vcc - V_{BE}} \quad (4)$$

Thus, the transistor $Q_{12}$ and therefore also the transistor $Q_{13}$ are rendered conductive after the lapse of time $t_0$ from the end of the period $t_1$. This means that during the pulse driving period $t_2$ in FIG. 3, the high level duration of the pulse signal coming from the controller 5 is extended by $t_0$ while the low level duration of it being shortened by $t_0$. This change of signal pulse is seen in FIGS. 12A and 12C.

The above explanation of the manner of pulse extension made with respect to the input pulse to the terminal $T_2$ is also applicable to the input pulse to the other terminal $T_3$ because the right-hand circuit part and the left-hand circuit part in the embodiment of FIG. 11 are entirely symmetric with respect to each other in arrangement. Therefore, the manner of operation of the right-hand circuit part having the input terminal $T_3$ enclosed by broken line in FIG. 11 need not be further described. However, only the following point should be taken into consideration:

The time constant for pulse extension on the side of terminal $T_3$ is given by $\tau' = c_2 \cdot r_{17}$ wherein $c_2$ is the capacity of condenser $C_2$ and $r_{17}$ is the resistance value of resistor $R_{17}$. To assure the same speed in the two different driving directions, this time constant $\tau'$ and the above-mentioned time constant $\tau$ should be equal to each other. However, if the mechanical load on the motor is not the same for two directions but the load in one direction is different from that in the other direction for any structural reason of the lens unit then used, then the time constants $\tau$ and $\tau'$ may be set to different values so as to compensate such a difference.

In the embodiment shown in FIG. 11, transistors $Q_{13}$ and $Q_{14}$ may be considered to control terminals $T_2$ and $T_3$ in FIG. 5. By thinking so, it will be understood that the above change in duty ratio of the input pulse produces an extension of non-conduction time of transistors $Q_{13}$ and $Q_{14}$ by $t_0$ thereby extending the motor driving time while shortening the braking time correspondingly, the total result of which is increase of average torque of the motor during the pulse driving period $t_2$ in FIGS. 12A–12C.

Transistor $Q_{11}$, condenser $C_1$ and resistor $R_{12}$ in FIG. 11 correspond to transistor $Q_{50}$, condenser $C_{50}$ and resistor $R_{50}$ in FIG. 7 respectively. The transistor $Q_{12}$ in FIG. 11 performs the functions of both of comparator CP and Zener diode DZ shown in FIG. 7. Thus, the base-emitter conjunction forward voltage $V_{BE}$ of the transistor $Q_{12}$ corresponds to the reference voltage Vth of the Zener diode DZ in FIG. 5.

As previously described, the level of high level input signal to terminal $T_2$ is set to a value higher than $Vcc + V_{BE}$. Further, a diode $D_7$ is connected to between $T_2$ and Vcc line. Therefore, when a high level signal is applied to $T_2$, the base potential of the transistor $Q_{11}$ is clamped to $Vcc + V_D$ wherein $V_D$ is the terminal voltage of the diode $D_7$. Since the voltage $V_D$ is nearly equal to $V_{BE}$, the emitter potential of $Q_{11}$ becomes the source voltage Vcc in the result. Consequently, the above discharging of the condenser $C_1$ is effected in such a manner that the charge on the condenser is fully discharged to nearly zero. This has an effect to improve the preciseness of the pulse extension time $t_0$.

In the above, the manner of operation of the pulse extension circuit has been described assuming that the control signal applied is a signal as shown in FIG. 3. However, it is to be understood that even in the case of pulse driving without braking as shown in FIG. 4 the pulse extension circuit in the driver shown in FIG. 11 operates entirely in the same manner as the above. During the full speed driving period $t_1$ and also during the braking period $t_3$ shown in FIG. 3, the circuit in FIG. 11 operates essentially in the same manner as the circuit shown in FIG. 5 although the former has a negligible small time delay. When the driver circuit as shown in FIG. 11 is used in a lens unit containing a taking lens having a large mechanical load such as a long focal length lens, always good servo responsiveness is assured by suitably setting the time constant according to the magnitude of the mechanical load and other conditions. As previously mentioned, in the case of large lens, the driving speed thereof decreases remarkably in the area near the in-focus position during the pulse driving period. This results in decrease in servo responsiveness. The driver circuit as shown in FIG. 11 can compensate such a reduction in servo responsiveness.

In FIGS. 5 and 11, $SW_1$ is a focus lock switch. When the switch $SW_1$ is switched ON, the emitters of transistors $Q_4$ and $Q_6$ are connected to terminals $T_2$ and $T_3$ through diodes $D_1$ and $D_2$ respectively. Thereby the driving mode is changed over to brake mode in which the taking lens is fixed independently of signals at $T_2$ and $T_3$.

As readily understood from the foregoing, the above-shown embodiments of the present invention have many advantages. The driver circuit provided on the lens unit's side contains therein a particular circuit for changing the time of power supply to the lens driving motor according to the driving characteristics of the taking lens. Therefore, the control outputs of the controller provided on the camera main body's side can be standardized independently of the kind of the taking lens in the lens unit. This is advantageous in particular in making the controller as IC or as a unit.

While the invention has been particularly shown and described with reference to preferred embodiments thereof, it is to be understood that the invention is not limited thereto but may be otherwise variously embodied within the scope of the invention. For example, in the above embodiments the pulse duty ratio has been changed according to the driving characteristics of the taking lens so as to obtain the most appropriate responsiveness and braking characteristics of the taking lens. However, the same purpose may be attained also by changing the voltage of the motor driving current. Further, it is not always necessary to provide the duty ratio expansion or compression circuit on the side of each lens unit as shown in the above embodiment. Such a circuit may be provided on the side of the camera body. In this case, the camera body is provided with means for reading the kind of the taking lens then used.

The motor driving current is changed not on the lens unit side but on the camera body side according to the detected driving characteristics of the lens. The driving current thus changed on the camera body side is then sent out to the lens unit side to control and drive the lens motor.

Obviously other modifications and variations are possible in light on the above teachings.

I claim:

1. A lens barrel containing an image-forming optical system having determined optical characteristics and movable in order to form an image of light from an object on a determined plane, said lens barrel being removably attachable to a camera body provided with a least an output terminal for a position pulse-form signal having a determined period and a determined duty ratio and indicative of the positional relation between the image forming position of said object light through said image-forming optical system and said determined plane and said lens barrel being provided with at least an input terminal connectable with said output terminal when said lens barrel is mounted on said camera body, and being capable of driving said image-forming optical system in the direcetion for forming the image of said object light on said determined plane by means of said position signal, said lens barrel comprising:
(a) driving means including a motor for driving said image-forming optical system;
(b) means for supplying a driving current to said motor
(c) means for generating characteristic signal indicative of said determined optical characteristics of said image-forming optical system;
(d) means for converting said position signal into an output signal whose period is equal to said determined period and whose duty ratio is different from said determined duty ratio in response to said characteristic signal and producing said converted signal; and
(e) means for controlling said driving current flowing into said motor according to said output signal from said conversion means.

2. A lens barrel according to claim 1, wherein said control means includes switch means for controlling the supply time of the driving current to the motor in reponse to the duty ratio of said output singnal from said conversion means.

3. A lens barrel according to claim 1, wherein said means for generating said characteristic signal includes means for charging electric charge from a voltage supply means and generating a voltage in response to said charged electric charge and said conversion means includes means for discharging said charged electric charge of said charge means at every determined period of said pulse-form signal and means for comparing the voltage which said charge means generates with a determined voltage.

4. A lens barrel according to claim 3, wherein said charge means includes capacitor means for charging electric charge from said voltage supply means and genenerating a voltage in response to the charged electric charge, and said discharge means includes means for short-circuiting said capacitor means at every determined period of said pulse-form signal.

5. A camera system having a lens barrel containing an image-forming optical system having determined optical characteristics and movable in order to form an image of light from an object on a determined plane and a camera body to which said lens barrel is removably attachable and which includes focus detection means for producing a position pulses-form signal having a determined period and a determined duty ratio and indicative of the positional relation between the image forming position of said object light through said image-forming optical system and said determined plane, said camera system comprising:
(a) driving means including a motor for driving said image-forming optical system:
(b) means for supplying a driving current to said motor;
(c) means for producing a characteristic signal inidicative of said determined optical characteristics of said image-forming optical system;
(d) means for converting said position signal into an output signal whose period is equal to said determined period and whose duty ratio is different from said determined duty ratio based upon said characteristic signal and producing said converted signal; and
(e) means for controlling said driving current flowing into said motor by means of said output signal of said conversion means.

6. A camera system according to claim 5, wherein said control means includes switch means for controlling the supply time of the driving current to the motor in response to the duty ratio of said output signal from said conversion means.

7. A camera system according to claim 5, wherein said means for producing said characteristic signal includes means for charging electric charge from a voltage supply means and generating a voltage in response to said charge electric charge, and said conversion means inculdes means for discharging said charged electric charge of said charge means at every determined period of said pulse-form signal and means for comparing the voltage which said charge means generates with a determined voltage.

8. A camera system according to claim 7, wherein said charge means includes capacitor means for charging electric charge from said voltage supply means and generating a voltage in response to the charge electric charge, and said discharge means includes means for short-circuiting said capacitor means at every determined period of said pulse-form signal.

9. A camera system comprising:
(a) a lens barrel having an image-forming optical system determined optical characteristics and movable in order to form an image of light from an object on a determined plane; and
(b) a camera body to which said lens barrel is removably attachable;
(c) said camera body comprising:
means for detecting the image forming position of said object light through said image-forming optical system and producing a detection signal informing of the image forming position and means for discriminating said image forming position by means of said detection signal and generating a first position signal when said image forming position is out of a determined range from said determined plane, a second position pulse-form signal having a determined period and a determined duty ratio when it is within said determined range and a third position signal when it is coincident with said determined plane;
(d) said lens barrel comprising:

driving means including a motor for driving image-forming optical system in the direction for bringing said image forming position into conincidence with said determined plane;

means for supplying a driving current to said motor;

means for producing a characteristic signal indicative of said optical characteristics of said image-forming optical system;

means for converting said second position signal into an output signal whose period is equal to said determined period and whose duty ratio is different from said determined duty ratio by means of said characteristic signal and generating said output signal; and means for controlling said driving current of said motor by means of said first and third position signals and said output signal from said conversion means.

10. In a lens barrel removably attachable to a camera body having a terminal generating a pulse-form signal having a determined duty ratio and a determined period, the lens barrel being provided with an input terminal connectable with the output terminal when the lens barrel is mounted on the camera body and a control circuit for controlling a driving current of a motor for driving an image-forming optical system based upon said pulse-form signal and an applied voltage, the control circuit comprising:

(a) signal conversion means for converting said pulse-form signal into a pulse-form output signal whose duty ratio is different from said determined duty ratio and generating the converted output signal;

(b) duty-ratio control means for controlling said conversion means in such a manner that the duty ratio of said output signal changes according to said applied voltage;

(c) period control means for controlling said conversion means in such a manner that the period of said output signal is substantially equal to said determined period; and (d) means for controlling the supply of said driving current to said motor according to the duty ratio of said output signal.

11. A lens barrel according to claim 10, wherein said driving current decreases with the lowering of said applied voltage and wherein said duty ratio control means causes the duty ratio of said output signal to be changed according to the change of the applied voltage in such a manner that the rotating speed of said motor is constant irrespective of the change of said applied voltage.

12. A lens barrel according to claim 10, wherein said duty ratio control means includes charge means which charges electric charge and generates a voltage according to the charged electric charge, wherein said period control means includes means which discharges the electric charge charged by said charge means in synchronism with said pulse-form signal and wherein said conversion means includes means for comparing the voltage which said charge means generates with a determined voltage.

13. A lens barrel according to claim 12, wherein said charge means includes capacitor means which charges electric charge and produces a voltage corresponding to said charged electric charge and wherein said discharge means includes means which short-circuits said capacitor means in synchronism with said pulse-form signal.

14. A camera system comprising:

(a) an image-forming optical system which is capable of forming an image of an object to be photographed on a determined surface;

(b) means for detecting the image forming position of said object through said image-forming optical system and producing a train of pulses corresponding to the image forming position, said train of pulses having a determined duty ratio and a determined period;

(c) a motor which drives said image-forming optical system in such a direction that said image forming position is coincident with said determined surface;

(d) signal conversion means for converting each of said pulses into a pulse-form output signal whose duty ratio is different from said determined duty ratio and generating said pulse-form output signal;

(e) means for applying voltage to at least said signal conversion means, said signal conversion means including duty-ratio control means for controlling said pulse-form output signal in such a manner that the duty ratio of said output signal changes according to said applied voltage and including period control means for controlling said pulse-form output signal in such a manner that the period of said pulse-form output signal is substantially equal to said determined period; and (f) means for controlling the supply of said driving current to said motor according to the duty ratio and the period of said pulse-form output signal.

15. A camera system according to claim 14, wherein said driving current decreases with the lowering of said applied voltage and wherein said duty ratio control means causes the duty ratio of said output signal to be changed according to the change of the applied voltage in such a manner that the rotating speed of said motor is constant irrespective of the change of said applied voltage.

16. A camera system according to claim 14, wherein said duty ratio control means includes charge means which charges electric charge and generates a voltage according to the charged electric charge, wherein said period control means includes means which discharges the electric charge charged by said charge means in synchronism with said pulse-form signal and wherein said conversion means includes means for comparing the voltage which said charge means generates with said determined voltage.

17. A according to claim 16, wherein said charge means includes capacitor means which charges electric charge and produces a voltage according to said charged electric charge and wherein said discharge means included means which shortcircuits said capacitor means in synchronism with said pulse-form signal.

* * * * *